Oct. 5, 1926.
W. H. SMITH
1,602,129
DECIMAL QUAD AND TYPE CHARACTERS FOR PRINTING
Filed August 10, 1925
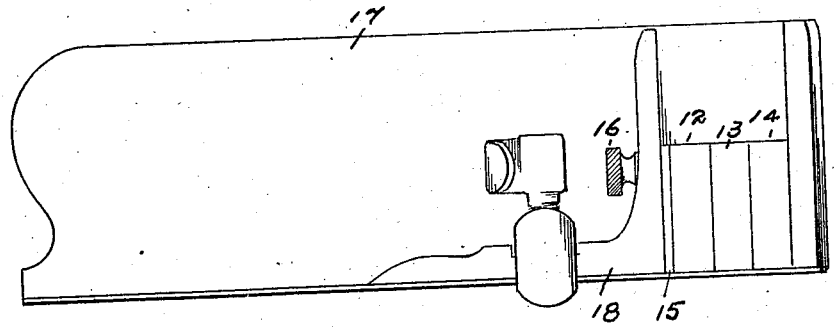
INVENTOR
William H. Smith
BY Baldwin Vale
ATTORNEY Patented Oct. 5, 1926.

1,602,129

UNITED STATES PATENT OFFICE.

WILLIAM H. SMITH, OF SAN FRANCISCO, CALIFORNIA.

DECIMAL QUAD AND TYPE CHARACTERS FOR PRINTING.

Application filed August 10, 1925. Serial No. 49,352.

This invention relates to improvements in the printer's art and more particularly to justifying quads and composing sticks for typesetting.

Certain modern developments in mechanical bookkeeping machines demand a compensating means between the printer's point system of measurement and the decimal divisional spacing of the typewriting machine. The printer's point system is seventy-two points to the inch or equal to the depth of six typewritten lines. While vertically this point measurement is adopted by all alphabet carrying bookkeeping machines, horizontally they switch to the decimal scale of measurement i. e., ten characters to the standard inch.

The principal object of this invention is to provide compensating means between the two scales of measurement above described. Another object is to facilitate the setting of type in accordance with the decimal system by modifying the typesetter's "stick." Other objects and advantages will appear as this description progresses.

In this specification and the annexed drawings, the invention is illustrated in the present preferred form, but it is understood that the invention is not limited to such form, because it may be embodied in other forms and it is to be understood that in and by claims following the description, it is desired to cover the invention in whatsoever form it may be embodied.

In the accompanying one sheet of drawing: Figure 1, is an impression of a statement sheet, set up in accordance with this invention, showing the divisions of the spacers or quads used in justifying this particular setup. Figure 2 is a similar view, for comparison of the same with the makeshift justification necessary without this invention. Figure 3 is a front view of a "stick" modified by this invention to facilitate type setting in accordance with the decimal scale.

Ledger, statement, distribution and other sheets used in mechanical bookkeeping machines are divided vertically into several columns 1, see Figure 1, with headings such as 2. These columns must be accurately built across the entire page to receive in proper register the characters and figures written by the machine. To obtain accurate results, this invention is necessary. The vertical lines 3 of the columns are printed from brass rules and I have adopted two-point thickness as standard; consequently a piece of two-point brass rule added to the decimal spacing material accomplishes accuracy and the compositor knows exactly the material required to build or fill a predetermined column. For instance, to build a column seven-tenths wide he uses a two-point brass rule, a master quad two points less than one-tenth of an inch and two quads each three-tenths of an inch in width. To figure how many points make seven-tenths of an inch, for instance, passes beyond typesetting into the realm of mathematics and is impracticable in the typesetter's art. This invention removes all guesswork and reduces these conflicting systems to easy mechanical operations, thereby saving endless wasted time and energy.

Since the columns 1 are in tenths of an inch, the headings 2 also must be in tenths. This result is accomplished by use of the stick as illustrated in Figure 3. To avoid odd lengths impracticable to cut to tenths minus 2 points, of brass rules, the two horizontal continuous rules 4 are used, and the vertical lines 3 are thus divided from the heading 2 as shown.

To get the proper alignment of these divided lines, the compositor sets the head 2 into proper measure in the stick, transfers it from the stick to the form, places a piece of brass rule 5 along the side and proceeds with the other sections of the heading. This removes all guesswork that must be resorted to when this invention is not available.

The master quad 6 setwise is two points less than one-tenth of a printer's inch. The digits 7, 8, 9, and 10 are respectively one, two, three and four-tenths setwise. The master quad 6 plus a two-point brass rule 3 makes the balance of each vertical column amenable to even tenths.

In Figure 3 the stick 17 is arranged to set a heading one inch setwise, the division being accomplished by the three quads 12, 13, 14, three-tenths of an inch and the master quad 15 that is one-tenth of an inch less two points. For convenience, the master quad 15 is secured to the knee by a screw fixed in the quad and engaged by the knurled nut 16 on the apposite side of the knee 18. The master quad is always required in the stick in practicing this invention.

Comparison of Figures 1 and 2 will disclose that it required thirty-eight spacing digits in Figure 2 to justify the composition, as compared with twenty-nine pieces in Figure 1, to justify the same matter, a saving of nine pieces. With the further advantages of absolute accuracy in Figure 1, while such accuracy cannot always be depended upon, when this invention is not used.

Having thus described this invention, what I claim and desire to secure by Letters Patent is:

1. A master quad the set width of which is two points less than one tenth of a standard inch.

2. A series of quads the set widths of which are multiple decimals of a standard inch and a master quad the set width of which is two points less than one tenth of a standard inch.

3. A line of type containing standard type characters, and a master quad the set width of which is two points less than one-tenth of a standard inch.

4. A type form the composition of which contains interspaced columnar rules, set on centers that are multiple decimals of a standard inch; a series of quads the set widths of which are multiple decimals of a standard inch and a master quad the set width of which is two points less than one-tenth of an inch, said quads being locked between said columnar rules.

5. A type form the composition of which contains interspaced columnar rules, set on centers that are multiple decimals of a standard inch; a series of quads the set widths of which are multiple decimals of a standard inch and a master quad the set width of which is two points less than one-tenth of an inch, said quads being locked between said columnar rules, and type headings registering with the space between said columnar rules and set between horizontal rules.

In testimony whereof I have hereunto affixed my signature.

WILLIAM H. SMITH.